(12) United States Patent
Seed et al.

(10) Patent No.: US 8,968,546 B2
(45) Date of Patent: Mar. 3, 2015

(54) CAPACITIVE DEIONIZATION CELL WITH RADIAL FLOW

(75) Inventors: Leonard Paul Seed, Guelph (CA); Daren D. Yetman, Guelph (CA); Iurie Pargaru, Guelph (CA); Gene Sidney Shelp, Guelph (CA)

(73) Assignee: Enpar Technologies Inc., Guelph, Ontario (CA)

( * ) Notice: Subject to any disclaimer, the term of this patent is extended or adjusted under 35 U.S.C. 154(b) by 399 days.

(21) Appl. No.: 13/139,331

(22) PCT Filed: Dec. 18, 2009

(86) PCT No.: PCT/CA2009/001848
§ 371 (c)(1),
(2), (4) Date: Jun. 13, 2011

(87) PCT Pub. No.: WO2010/069065
PCT Pub. Date: Jun. 24, 2010

(65) Prior Publication Data
US 2011/0240474 A1    Oct. 6, 2011

(30) Foreign Application Priority Data
Dec. 18, 2008    (GB) .................................. 0823074.0

(51) Int. Cl.
*C02F 1/469*   (2006.01)
*C02F 1/461*   (2006.01)

(52) U.S. Cl.
CPC ........... *C02F 1/4691* (2013.01); *C02F 1/46114* (2013.01); *C02F 2201/003* (2013.01)
USPC ........................................................ 204/627

(58) Field of Classification Search
USPC ......... 204/518, 520, 522, 627, 630, 633, 638, 204/639, 666, 674
See application file for complete search history.

(56) References Cited

U.S. PATENT DOCUMENTS

| | | | |
|---|---|---|---|
| 3,972,795 A * | 8/1976 | Goens et al. | ........... 204/269 |
| 5,415,768 A | 5/1995 | Andelman | |
| 5,425,858 A | 6/1995 | Farmer | |
| 5,954,937 A | 9/1999 | Farmer | |
| 6,090,259 A | 7/2000 | Fajt et al. | |
| 6,346,187 B1 | 2/2002 | Tran et al. | |
| 6,709,560 B2 | 3/2004 | Andelman et al. | |
| 2002/0167782 A1 * | 11/2002 | Andelman et al. | ........... 361/302 |

FOREIGN PATENT DOCUMENTS

| | | |
|---|---|---|
| EP | 2070875 | 6/2009 |
| KR | 10-2007-0048420 | 11/2008 |
| WO | WO 01/90444 | 11/2001 |
| WO | WO 2009077276 A1 * | 6/2009 |

* cited by examiner

*Primary Examiner* — Keith Hendricks
*Assistant Examiner* — Steven A. Friday
(74) *Attorney, Agent, or Firm* — Anthony Asquith Corp.

(57) ABSTRACT

A water treatment apparatus comprising a stack of circular electrodes with a central through hole, the electrodes are supplied with electricity so as to form anodes and cathodes in alternating intercalation. The anodes and cathodes so arranged to lie in such close-spaced parallel face to face relationship as to form a capacitive deionization cell. Water to be treated is passed from the outside of the stack, radially inward through between the electrodes into the central through hole and then axially out of the stack.

13 Claims, 5 Drawing Sheets

CAPACITIVE DEIONIZATION CELL WITH RADIAL FLOW

This technology relates to the removal of dissolved contaminants from a liquid, and will be described as it particularly relates to the desalination of salt water.

BACKGROUND TO THE INVENTION

It is known to desalinate salt water by Capacitive Deionization (CDI) (also sometimes known as Electrostatic Deionization). The process basically consists in passing the salt water between a pair of electrodes, each of large surface area, between which a DC voltage is applied. Positive ions (e.g Na+ ions) migrate to the cathode, and negative ions (e.g Cl− ions) migrate to the anode. The adsorbed ions are then bound to the respective electrodes. From time to time, the stored ions are removed from the electrodes by an appropriate regeneration process.

Typically, in the conventional CDI cells, the electrodes are in the form of flat plates or sheets of e.g activated carbon. Salt water flows along the space between the plates, the ions being attracted to the appropriate electrode by electrostatic forces. Thus, the ions are adsorbed onto the respective electrodes from the passing water.

A conventional CDI-based treatment apparatus generally includes several of the cells, arranged in a stack of cells, and includes suitable structure for mounting the electrodes of the individual CDI cells, and for conveying the water into and through the spaces between the electrodes.

Ions are adsorbed into the porous material of the electrodes, and are retained and stored therein, whereby the effluent water from the CDI cell is less salty than the influent water.

For regeneration, usually the flow of salt water undergoing treatment is switched off, or re-routed, and a flow of regeneration water is now passed through the CDI cell. (In some cases, the regeneration water can be the same salt water.) Traditionally, the polarity of the cells is reversed, whereby the adsorbed ions are repelled from the electrodes, and enter the regeneration water. Typically, regeneration is carried out a few times per hour, and the regeneration process is typically completed in a few minutes. The treatment/regeneration cycle preferably should be automated.

The salt content of the effluent regeneration water is usually considerably (e.g ten times) higher than that of the salt water being desalinated. Where the salt water is drawn from the sea, the high-salt regen-water is simply discharged into the sea. If disposal in the sea is not available, further treatment of the concentrate stream might be required; however, the volume of the concentrate is typically only about five percent of the treated water stream.

Conventional CDI cells may or may not be provided with charge-barriers, which are ion-permeable membranes that are impervious to water, and placed over one or both of the electrodes. Charge barriers are aimed at preventing contamination of the electrode pore volume with the source water and to prevent re-adsorption of the ions during regeneration.

THE INVENTION IN RELATION TO THE PRIOR ART

In the traditional CDI cells, the electrodes are square or rectangular. That is to say, all the drops of water are always moving parallel to each other. In the CDI treatment systems as described herein, the water passes through the treatment space between the plates basically on a radial-flow basis. Thus the flow through and between the electrodes is slow at first, then faster. This is an advantageous characteristic, as will be explained.

DETAILED DESCRIPTION OF PREFERRED EMBODIMENTS

The technology will now be further described with reference to the accompanying drawings, in which:

FIG. 1 is a cross-section of a portion of a group of CDI cells, arranged for radial flow of the water to be cleaned, the flow being parallel to the plane of the electrodes. In FIG. 1, vertical dimensions are exaggerated, the better to illustrate the structures.

The scope of the patent protection sought herein is defined by the accompanying claims. The apparatuses and procedures shown in the accompanying drawings and described herein are examples.

Figure 1:
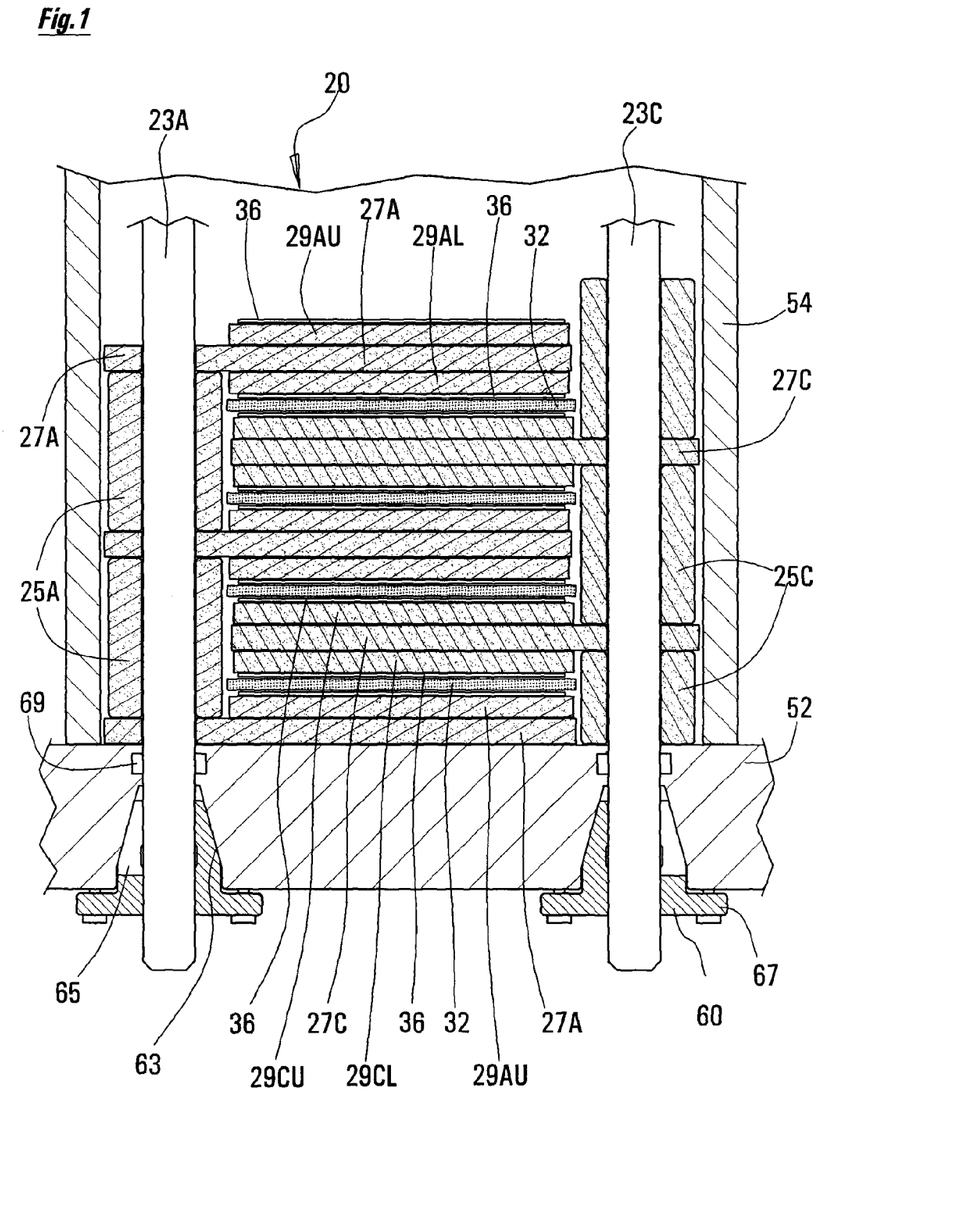

FIG. 1 shows a stack 20 of CDI cells. The stack is under construction, in that only some of the electrodes have been assembled. FIG. 1 is diagrammatic—that is to say, the cross-section is a composite, done to illustrate the layout of the electrodes and associated components, and does not show the path taken by the water being treated. Also in FIG. 1, the vertical dimensions of the components have been highly exaggerated.

Electric current is fed to the electrodes through bus-rods 23A,23C. The bus-rod 23A is energized with a positive voltage. From the bus-rod 23A, current enters the graphite blocks 25A, of which three are shown in FIG. 1. Two graphite current-carriers 27A are shown in FIG. 1. Each carrier 27A is contacted by, and held between, two of the blocks 25A. The current-carriers 27A receive current from the bus-rod 23A through the graphite blocks 25A, and transfer the current, in turn, to upper and lower elements 29AU,29AL of an electrode unit 30, which in this case is an anode unit 30A. In fact, two anode units 30A are shown in FIG. 1.

The bus-rod 23C is energized at a negative voltage. Current between the upper and lower cathode elements 29CU,29CL passes to the cathode current-carriers 27C, and thence to graphite blocks 25C for transfer to the cathode bus-rod 23C. Three cathode units 30C are shown in FIG. 1. (The bottom-most unit, being the last in the stack, includes only one cathode-element 29CU, rather than a pair of cathode elements 29CU,29CL as in the other two cathode units.)

The upper element 29AU of an anode unit 30A is held in a spaced-apart relationship with respect to the lower element 29CL of an adjacent cathode unit 30C, by a flow-conductor 32. The flow-conductors 32 are of a very open structure, their function being to conduct the flow of water radially inwards, through the treatment-space or flow-space between the anode and the cathode. In the example, the flow-conductors 32 are of an open-weave construction. The flow-conductors 32 also serve to hold the electrodes apart, and in this capacity are made from e.g polyester or other plastic dielectric material, which is chemically inert with respect to the salt and whatever other contaminants might be present in the water.

Figure 2:
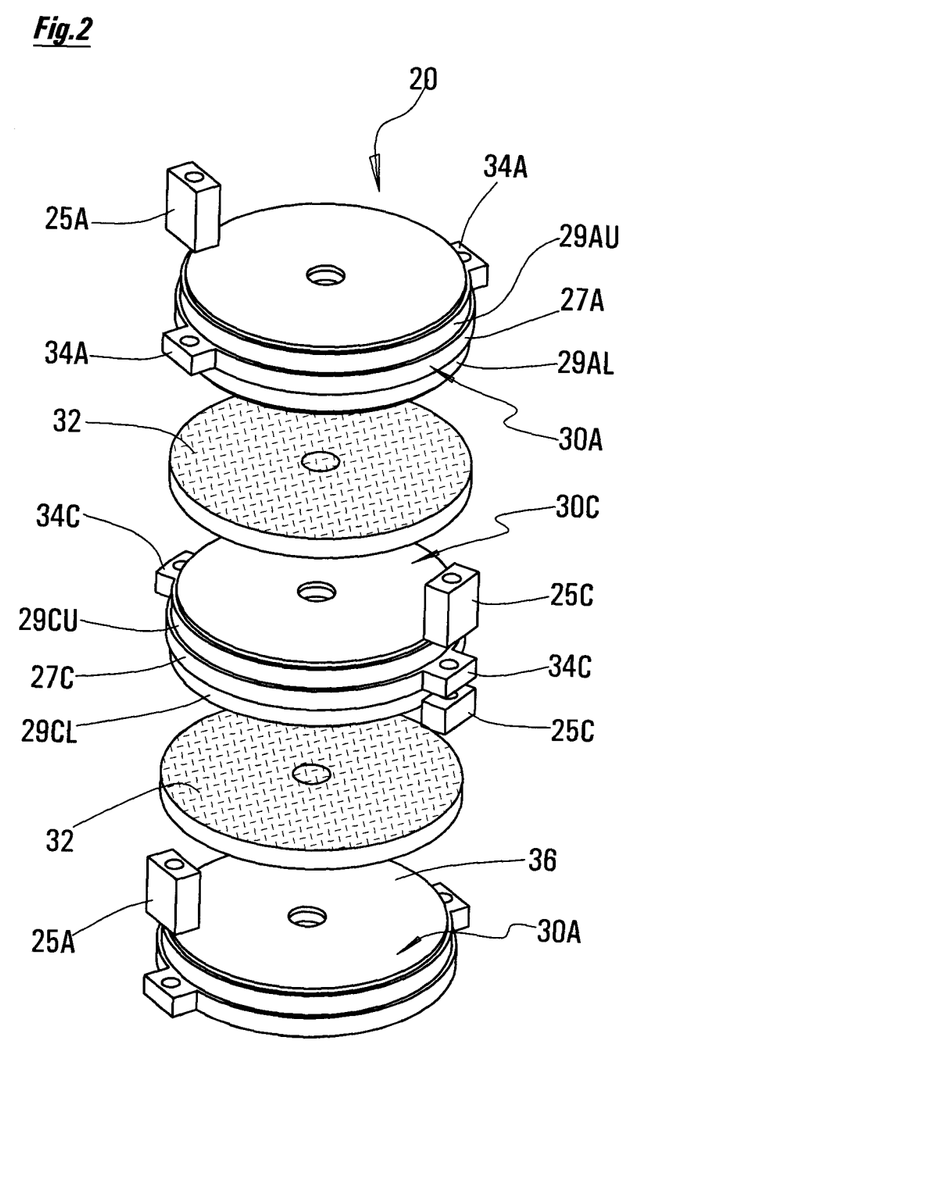
FIG. 2 is a pictorial view of the electrodes and associated components of FIG. 1. Again, in FIG. 2, the vertical dimensions are exaggerated.

As shown in FIG. 2, each anode current-carrier 27A has two tabs 34A, and each cathode current-carrier 27C has two tabs 34C. There are two positive bus-rods 23A, in the example, located 180 deg apart from each other with respect to the axis of the stack 20, and two negative bus-rods 23C, located at 90 deg therebetween; and the two tabs 34A engage with the two bus-rods 23A. That is to say, through-holes in the tabs 34 slide over the bus-rods 23. The graphite blocks 25 also have through-holes, which also slide over the appropriate ones of the bus-rods 23.

FIG. 2 shows two of the anode units 30A in the stack 20, and one cathode unit 30C. FIG. 2 also shows the shape or form of the graphite blocks 25. The functions of the blocks 25 include the transfer of current from the bus-rods 23 to the current-carriers 27, and holding the electrodes the optimum distance apart. Also, the blocks should not be extensive circumferentially; that is to say, the blocks should be small enough, circumferentially, to leave ample access room for the water to enter the perimeter or circumference of the operational space between the electrodes.

Present in association with each electrode element 29 is a charge barrier. The charge barrier is a membrane 36 overlying the electrode, i.e between the electrode and the water being treated. The charge barrier membrane is impervious with respect to liquid water, but is permeable to ions.

As mentioned, the vertical dimension of the electrode components in FIGS. 1,2 is grossly exaggerated. In the example, the graphite electrode elements 29 are 250 microns thick, as are the current-carriers 27. The flow-conductors are 100 microns thick (and thus the thickness of the treatment-space is 100 microns). The charge barriers are: cation, fifteen microns thick; anion, 100 microns.

Portions of the opposed or facing anode/cathode elements are in a physically-overlapping close-spaced face-to-face relationship. That is to say, an operational area portion of the area of one of the anode elements is a portion of the area that overlies, i.e directly faces, when viewed in a direction parallel to the axis of the stack, a corresponding portion of the area of the face of the adjacent cathode element. The operational area between a pair of adjacent anode and cathode elements is the area thereof in which the distance between the two electrodes is sufficiently small that a substantial capacitive effect is created therebetween.

Thus, of course, it is possible for an electrode to have a portion of its area that is not included within its operational area. Where a portion of one of the electrodes of an anode/cathode pair protrudes laterally beyond the other, the perimeter of the operational area is defined by the area of overlap, and the protruding area (for example, the area occupied by a tab 34 of an electrode unit) is not part of the operational area of the electrode.

The operational area has a boundary or perimeter. When the apparatus is operational, salt water that crosses the perimeter, and enters the operational area, starts to undergo deionization. The space between an anode and an adjacent cathode, and inside the perimeter of the operational area of that pair of electrodes, may be termed the treatment-space or flow-space of that pair.

The flow-spaces or treatment-spaces occupied by the individual flow-conductors 32 have each their own respective individual operational areas. In the example, all the operational areas are right-circular, which is preferred, and all are nominally the same number of square metres (being about half a square meter in the examples).

Figure 3:
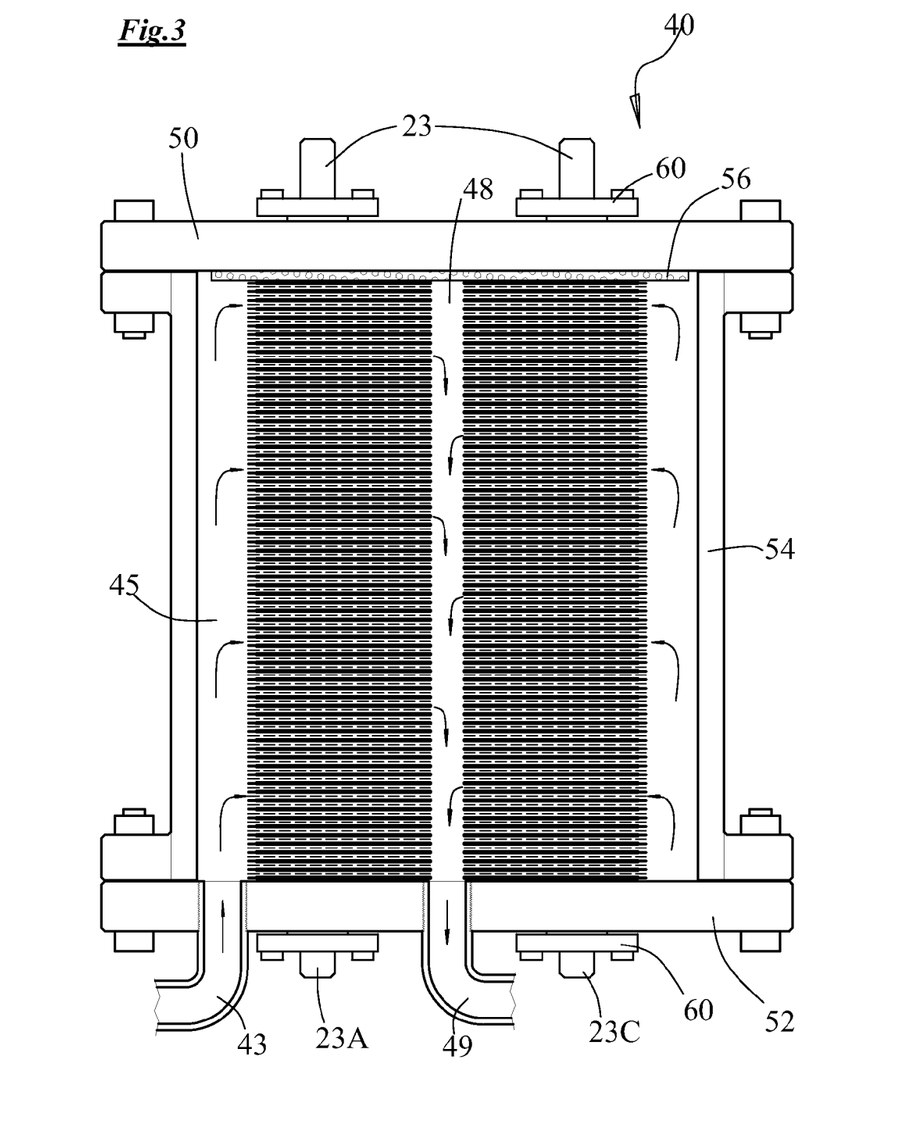
FIG. 3 is a cross-section of an encased stack of CDI electrodes, showing the radial flow of water inwards from the outer perimeter of the electrodes, towards a central hole.

FIG. 3 is a cross-section through a water treatment apparatus 40. In FIG. 3, the vertical dimensions of the electrodes and flow-conductors is more to scale (although the vertical scale of the electrodes is still somewhat exaggerated). The bus-rods 23, and the tabs 34, are not present in the plane of the section of FIG. 3, but they are connected to the electrodes in such manner as to create anodes and cathodes in alternating intercalation.

Water to be treated enters the apparatus 40 through a water-inlet-port 43. Thus, the water enters the annular space 45 outside the perimeter 47 of the operational area of the electrodes. The water, when in this annular chamber 45, is under pressure, and the water escapes therefrom by entering the flow-spaces between the electrodes, i.e the spaces occupied by the flow-conductors 32.

The ideal is for the water to enter the flow-spaces evenly, all around the perimeter of the operational area, and for the water to enter equally into all the many such flow-spaces. While this ideal is impossible to achieve, the structure of the apparatus as described herein can be expected to produce a very good performance, from the standpoint of equalness and evenness of flow through the many flow-spaces.

The volume of the annular space or chamber 45 should be large enough to serve as an inlet-plenum, i.e to ensure that every drop of water in the annular chamber is at the same pressure (adjusted for gravitational head). Similarly, the column 48 of water residing above the water-outlet-port 49, in the centre of the stack of electrodes, should be large enough to serve as an outlet plenum, again with the intent that every drop of water in the central space 48 is at the same pressure (adjusted for gravitational head).

For example, during operation, the pressure at the top of the annulus 45 might be e.g twenty psi, and the pressure at the top of the outlet-port 49 e.g five psi; at the same time (the stack being e.g two metres high) the pressure at the bottom of the annulus 45 is twenty-three psi, while the pressure at the bottom of the port 49 is eight psi. That being so, it is easy for the designers to ensure that the differential pressure between the outer perimeter of one flow-conductor 32 and the inner- or port-end of the same flow-conductor (being always a differential of fifteen psi in the example) to be the same all the way around the perimeter 47 of the operational area of the flow-spaces, and to be the same for all the many flow-spaces. From this standpoint, it can be advantageous to maintain the pressure in the outlet-port 49 at a positive value, and the designers may provide a pressure regulator, downstream of the outlet-port 49, for this purpose.

The outlet-plenum 48 should not be of such small dimensions as to constrict or inhibit the entry of liquid thereinto and the flow of liquid therealong. The dimensions of the outlet-plenum at which such constriction might occur depend on the pressure and through-flow rate of the apparatus as a whole. Typically, the cross-sectional area of the outlet-plenum, i.e of the whole of the open column along the axis of the stack of electrodes, should preferably be larger than the area of the inlet-port.

The outlet-port 49 may be located at the top of the apparatus, rather than at the bottom, which can be advantageous in that any gases trapped in the apparatus are easily and automatically bled off.

It may be noted that, if the stack of electrodes were to be set up with its axis horizontal, the pressure differential would be greater in the vertically-lower sectors of the flow-conductor spaces than in the higher sectors. In that case, although the flow would be distributed equally between the many spaces, the flow would not be even, as measured in the different sectors around the perimeters of the spaces. Thus, the vertical orientation of the axis of the stack, as shown, is preferred—although the horizontal orientation is not ruled out.

The stack of electrodes as shown in the apparatus 40 of FIG. 3 is under a slight compression, by virtue of the nominal height of the stack being slightly larger than the internal height of the treatment chamber defined between the top-plate 50, the bottom-plate 52, and the cylinder 54, of the apparatus 40. The degree of compression of the stack of electrodes should not be so much that the flow-spaces become constricted, and yet the degree of compression should be large enough to ensure that water cannot bypass the flow-spaces. There must be no path through the treatment chamber, from the annular space 45 to the water-outlet-port 49, which is more permeable than the paths through the flow-spaces.

If some extra elasticity is needed in respect of the stack of electrodes, it can be advantageous to insert a sheet 56 of e.g resilient foam plastic material, of the desired stiffness, between e.g the topmost electrode unit and the underside of the top-plate 50. If of foam, of course the foam should be the type in which the pores of the foam are not interconnected—because, again, there should be no pathway other than the flow-spaces for water to pass between the outer annular chamber 45 and the port 49. The sheet 56 (or sheets) of foam may be inserted elsewhere in the stack.

There are corresponding stacks of blocks 25 on the bus-rods 23. These blocks also should also be under some compressive force, to ensure good electrical contact between them and the electrode current-carriers 27. Graphite is somewhat compressible, and the designers may prefer to rely on that compressibility, and just arrange for the stack of blocks to be compressed between the plates 50,52. If it is desired to provide more elasticity, again that can be provided by way of e.g an elastically-compressible ring that encircles the bus-rod, and is placed e.g between the topmost block 25 and the top plate 50.

The designers should see to it that, when the stack of electrodes and the four stacks of graphite blocks have been compressed into their working positions, that the stacks complement each other as to vertical position; if the stacks were mismatched, vertically, that might cause the thin relatively-fragile sheets of graphite foil material to be over-flexed and damaged.

The through-holes in the graphite blocks should be a tight fit on the bus-rods. Even if the holes were to be an interference fit, still it is a simple matter to slide the blocks along the bus-rods, since graphite is inherently self-lubricating. Compressing the blocks can serve to make the fit even tighter, which is advantageous from the standpoint of ensuring good electrical contact between block and bus-rod.

The current-carriers 27 are arranged for receiving electrical current from the bus-rods 23, and for feeding that current into the sheets of graphite. The current enters the current-carriers 27 via the tabs 34 of the carriers 27. The apparatus includes structure termed a current-connector, by means of which the current is transferred from the bus-rod 23 to the tab 34. The current-connector includes structure termed a tab-clamp, by means of which the current-connector is clamped to the tab 34, and includes structure termed a rod-clamp, by means of which the current-connector is clamped to the bus-rod 23.

In FIGS. 1,2, each tab 34 is sandwiched between graphite blocks 25. The blocks 25 are under compression, whereby the tab 34 is clamped between the blocks 25. Thus, the tab-clamp, in this case, is that portion of the FIGS. 1,2 apparatus, the tab 34 between located between the blocks 25, that applies a (vertical) compressive force thereto. The rod-clamp is that portion of the FIGS. 1,2 apparatus that provides a tight fit between the block 25 and the rod 23, and applies the compressive force to the block. Again, the tightness of the clamps is enough to ensure good electrical connection.

Figure 3A:
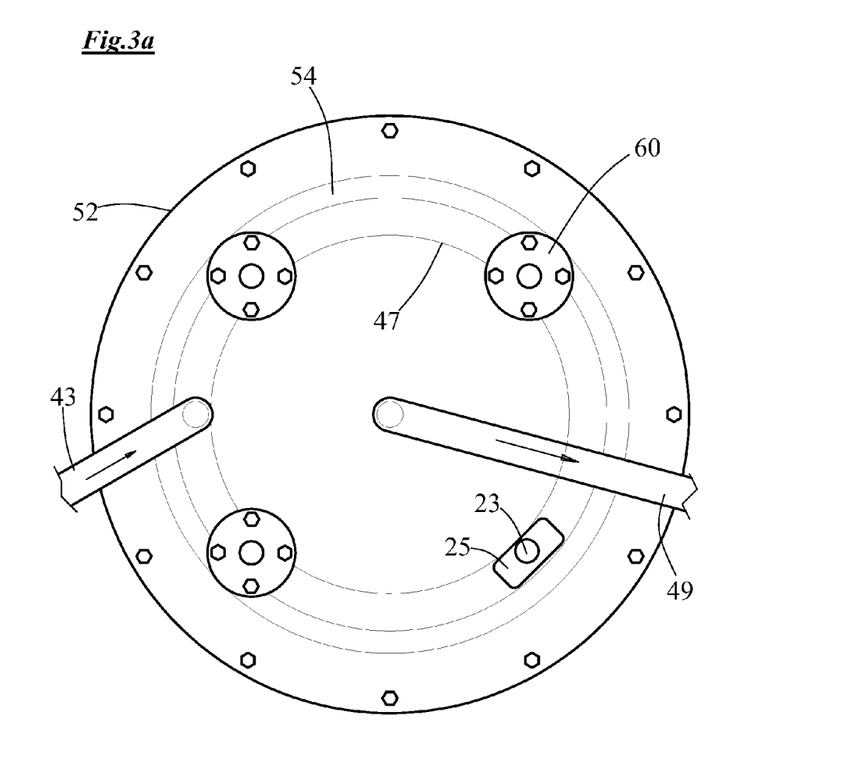
FIG. 3a is a view of the underside of the casing of FIG. 3.

FIG. 3a is a view from underneath the apparatus of FIG. 3. (One of the four bus-rod mountings 60 has been omitted, in FIG. 3, to show the position of the graphite block on the bus-rod.) Water to be treated enters via the inlet-port 43, and fills up the annular chamber 45. The graphite blocks 25 and the tabs 32 of the current-carriers 27 do not seal against the inner wall of the cylinder 54, and the water fills the whole annulus 45 even if supplied from just the one location; but, if desired, additional inlet-ports 43 can be provided.

From the annulus 45, a drop of water enters one of the many flow-spaces or treatment-spaces, and acquires a radially-inwards velocity vector. After travelling through the respective flow-space, the (now treated) water enters the water-outlet-port 49 and is discharged.

Of course, the velocity vector of the drop of water increases, as its radius decreases. However, the concentration of ions in the drop of water decreases as the drop moves inwards within the flow-space, i.e as more and more of the ions dissolved therein are adsorbed into the electrodes. An ion loading rate of the salt water, with respect to the electrode, may be measured in ions/sq. cm/second, and it will be understood, in the case of the radial-flow configuration, that this rate is likely to very nearly uniform, as a result of the increasing velocity of the drop combined with its diminishing concentration. This uniformity of ion loading rate, associated with the radial-flow configuration, may be contrasted with the diminishing ion loading rate that is usually encountered in the traditional CDI arrangements, in which it is the velocity vector of the drop of water that remains uniform.

The four bus-rods, two positives 23A and two negatives 23C, are attached into the top and bottom plates 50,52 in a manner that will now be described. The bus-rod mounting 60 is shown in cross-section in FIG. 1. The plate 52 is made from a hard dielectric plastic material. A conical recess 63 is formed in the plate 52, and a complementary collet 65 engages the recess. The conical part of the collet has slits. When flange 67 of the collet is tightened towards the plate, the collet is driven into the cone, and the slit area is driven inwards to grip the bus-rod. Thus, the collet, in addition to locking the bus-rod 23 mechanically in place with respect to the plate 52, also makes a very intimate electrical contact with the bus-rod. It is a simple matter for the designer then to provide an attachment for the electrical cable, on the mounting 60. Simple O-rings 69 seal the bus-rods into the plate.

Four corresponding collet-based fasteners are provided for the four bus-rods 23 also in respect of the top plate 50.

In the example, the bus-rods themselves are made of copper, for good conductivity, and have a coating of titanium, which is (almost) inert with respect to salt water.

Figure 4:
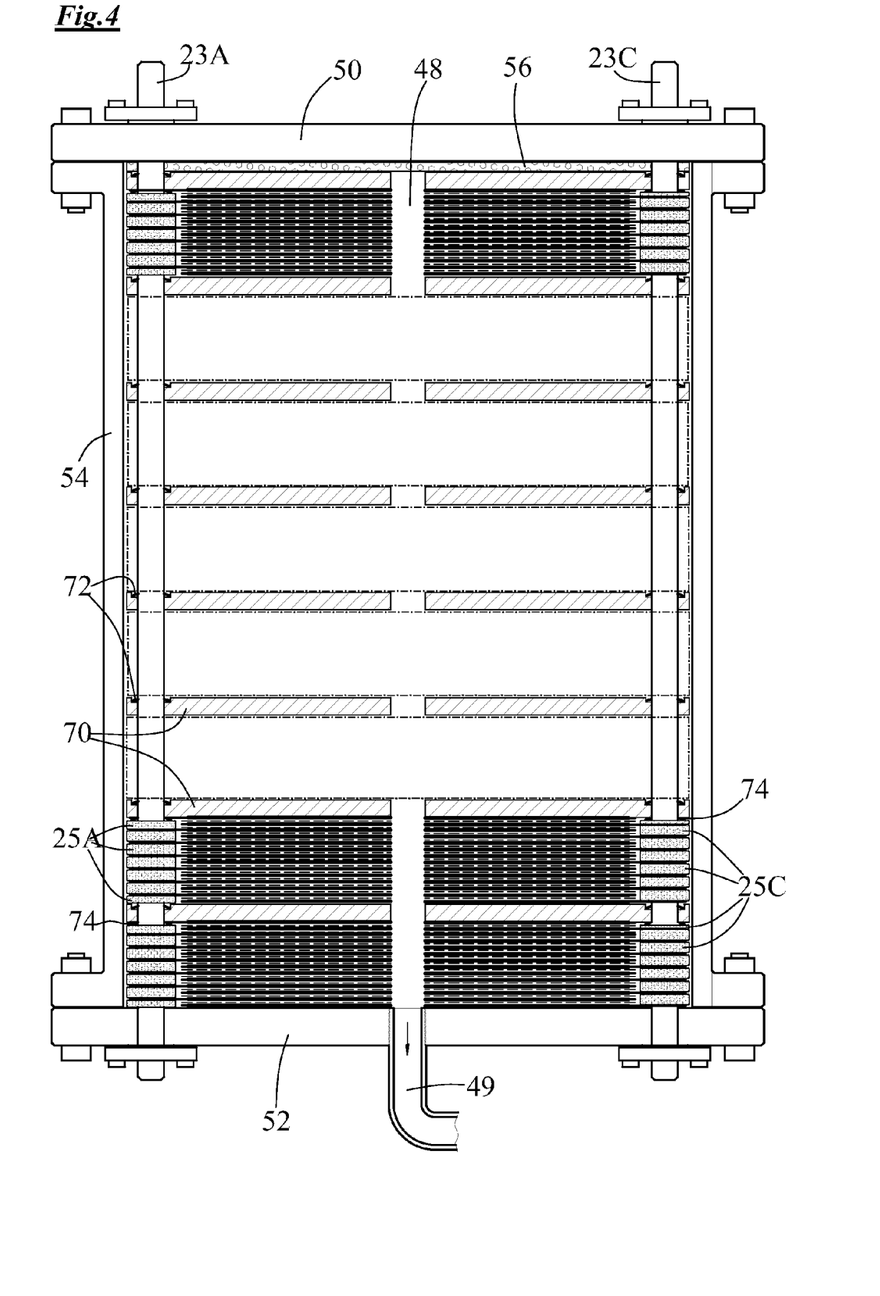
FIG. 4 is a view of another encased stack of CDI electrodes, showing some assembly aids and other features.

FIG. 4 shows another manner in which the electrodes can be assembled for the purposes of the radial-flow CDI treatment system. Here, the electrode units are grouped into sub-assemblies. In a long (high) stack of electrodes arranged as in FIG. 3, the weight of the electrodes themselves can be significant. That can result in the electrodes at the bottom of the stack being pressed together more tightly than the electrodes at the top, the effect of that being that the flow-spaces at the bottom of the stack are (slightly) narrower than the flow-spaces at the top. In the interests of making it easy to ensure evenness of compression on all the electrodes, the sub-assembly system of FIG. 4 may be utilized.

In the simple stack system of FIG. 3, the designer must see to it that the height of the stack of graphite blocks and current-carriers threaded onto the bus-rods is the same as the height of the stack of electrodes. If the designers are not careful, it could happen, for example, that, when the components are assembled into the casing, and the top and bottom plates are secured in position, the height of the stack relative to the height of the casing is such that the stack is not compressed, at all, by the casing. But then, if one more electrode were to be added to the stack, the situation might be that the stack is over-compressed.

There is a similar situation with regard to the stack (i.e, the four stacks) of carbon blocks and current-carriers. That is to say, it can be difficult to get just the right amount of compression, when the height of the stack of blocks has to be accurately matched to the height of the casing. The inclusion of the resilient foam sheet 56 can, as described, alleviate the effects of the mismatch of the stacks (i.e the stack of electrodes and the stacks of graphite blocks) with respect to the height of the casing. But still, the height of the stack of electrode units, when compressed to its optimum degree, might be mismatched with respect to the heights of the four stacks of the carbon blocks, when they too are compressed to their optimum level. Again, the effect of this remaining mismatch might be that the relatively thin graphite foil material of the electrodes and current-carriers might become stretched or flexed to the point of damage.

The sub-assembly system of FIG. 4 again is aimed at alleviating such problems. In FIG. 4, a first batch of e.g twenty electrode units, with associated graphite blocks, are assembled onto the bus-rods. To achieve the desired degree of compression of the stack of twenty electrodes, an intermediate plate 70 is placed over the assembled stack of electrodes, and is pressed down with a desired magnitude of force. The operation of pressing the plate 70 downwards is effective also to press four one-way lock-washers 72 downwards on the bus-rods. The lock-washers are slightly dished, and little force is required to move the lock-washers downwards on the bus-rods; but a much greater force would be required to move the lock-washers upwards, whereby whatever is the downwards limit of travel of the lock-washers, on the bus-rods, that is where the lock-washers remain after the downwards force is released. Thus, whatever force was applied to the plate 70 to compress the stack, the lock-washers lock that force in.

In FIG. 4, the designers have deliberately made the heights of the four stacks of graphite blocks and current-carriers slightly smaller than the height of the compressed stack of electrodes. Four springs 74 are placed on top of the four stacks of graphite blocks. Therefore, when the intermediate-plate 70 is pressed down into position to compress the stack of electrodes, each of the four stacks of graphite blocks is compressed to the force as dictated by the respective four springs.

The springs 74 can be provided as wave-washer-springs, belleville-springs, etc. Alternatively, the spring function can be provided by interposing an appropriate thickness of resilient elastic material between the top of the stack and the underside of the plate 70. (The spring could be alternatively located e.g underneath the stack.) Whatever form of spring is used, the material thereof should be salt-resistant.

In an alternative, in addition to the springs 74 being in place with respect to the four stacks of graphite block being, also a sheet of foam material is placed on top of the stack of twenty electrodes, much like the sheet 56 of foam material is placed as shown in FIG. 3. With such a sheet also in place, when the intermediate plate 70 is pressed downwards, the plate does not directly compress either the electrode stack or the four block stacks, but rather the force of compression in all five of the stacks is as dictated by the respective provided resilience.

The first sub-assembly having been made, and locked in position by the lock-washers 72, the rest are assembled in a similar manner. Eight sub-assemblies are shown in FIG. 4. As shown, each of the thirty-two stacks of graphite blocks has its own spring, whereby the uniformity of compression force in the stacks of blocks can be expected to be high. As shown, the individual sub-assemblies do not have foam sheets, and it is simple matter to ensure that all the stacks in all the sub assemblies are compressed to the same force by pressing down on the plate of the topmost sub-assembly with a greater force than has already been applied to the sub-assemblies underneath, whereby all the sub-assemblies are left with the same compressive force locked into each one. The space between the topmost intermediate plate and the top-plate should be occupied with a sheet of plastic foam of suitable thickness, as shown.

The assembly of the eight sub-assemblies can be done outside of the casing, i.e with top-plate 50 and the cylindrical tube 54 not present. Assembly is easy, and requires very little from the production line operators. Erecting the apparatus of FIG. 4 can be characterized by a marked absence of e.g fastening operations, of the kind for which manual skill and careful attention would be needed.

The respective operational areas between the pairs of electrodes should be circular. The outlet port should be placed concentrically, i.e at the centre of the circle. The intent is that every drop of water passing through the operational areas should follow identical paths; if the operational areas were not circular, the paths traveled by the water would be of different lengths, which is not preferred.

Regeneration of the CDI electrodes is done by reversing the polarity of the electrodes, and then flushing through with water. After regeneration, the regen water can be expected to contain salt at a greater concentration than the water to be treated, and this very salty regen water needs to be disposed of. During operation, regeneration would be done e.g three times an hour, and would take e.g three minutes.

In the designs as described herein, it should be noted how easy it is to seal the salt water chamber, and to seal the conduits that conduct the salt water therethrough. No seals are required in respect of the individual electrodes. The outer annulus 45 and the inner water-outlet-port 49 do not require to be sealed relative to the electrodes. The bus-rods 23 do need to be sealed into the top and bottom plates 50,52, but that is easily done with simple O-rings.

In the designs as described herein, there is no requirement for complex metal components inside the chamber containing the salt water. The lock-washers and springs, if provided, should be made of titanium, but such components are available in titanium on a proprietary catalog basis.

In the designs as described herein, there is an arrangement of intercalated anodes and cathodes. However, no internal wiring is required, and all the required electrical contacts are made in such manner that the equivalent series resistance (ESR) of the stack of cells is minimized.

In the apparatus depicted in FIGS. 1,2, the current-carriers 27 of the electrodes have respective tabs 34. The tabs 34 are associated with current-connectors, which perform the function of conducting electricity between the tabs and the bus-rod 23.

The current-connector includes a tab-clamp, which is effective to exert a tab-clamping-force upon the tab 34, of suffcent magnitude to ensure good electrical contact between the current-connector and the tab.

The current-connector also includes a rod-clamp, which is effective to exert a rod-clamping-force upon the bus-rod 23 of suffcent magnitude to ensure good electrical contact between the current-connector and the bus-rod 23.

The current-connector includes compressible graphite blocks 25 on the bus-rod 23 and includes the means, as described, by which the compressive axial force is exerted on the blocks. The compressive axial force, when applied, directly creates the tab-clamping-force by which the tabs 34 are squeezed axially between adjacent blocks, and simultaneously indirectly creates the rod-clamping-force which laterally squeezes the blocks 25 tightly against the bus-rod 23.

The numerals used in the drawings can be summarized as:
20 stack of CDI cells
23 bus rods
23A positive bus-rods
23C negative bus-rods
25 graphite blocks
25A anode blocks
25C cathode blocks
27 current-carriers
27A anode current-carriers
27C cathode current-carriers
29 electrode element
29AU upper element of anode unit
29AL lower element of anode unit
29CU upper element of cathode unit
29CL lower element of cathode unit
30 electrode unit
30A anode unit
30C cathode unit
32 flow-conductors
34 tabs on current-carriers
34A anode tabs
34C cathode tabs
36 charge barrier membrane
40 apparatus of FIG.3
43 water-inlet-port
45 annular chamber =inlet plenum
47 perimeter of operational area of electrodes
48 central column =outlet plenum
49 water-outlet-port
50 top plate
52 bottom plate
54 tubular cylinder
56 sheet of resilient plastic foam material
60 bus-rod mountings
63 conical recess
65 split collet
67 flange of collet
69 O-ring seals
70 intermediate plate
72 one-way lock-washers
74 springs Some of the components and features in the drawings have been given numerals with letter suffixes, which indicate different versions of the components. The numeral without the suffix has been used herein to indicate the component generically.

Terms of orientation (e.g "vertical" and the like) when used herein are intended to be construed as follows. The terms being applied to an apparatus, that apparatus is distinguished by the terms of orientation only if there is not one single orientation into which the apparatus, or an image of the apparatus, could be placed, in which the terms could be applied consistently.

The invention claimed is:

1. Liquid treatment apparatus, wherein:
apparatus includes a stack of electrodes, which are so supplied with electricity as to form alternating anodes and cathodes;
each electrode is of high-surface-area conductive material;
the stack includes pairs of electrodes, each pair comprising one of the anodes together with an adjacent one of the cathodes;
in respect of each pair:
(a) the anode and cathode of the pair are so arranged that portions thereof lie in such close-spaced parallel face-to-face overlapping relationship that the portions form a capacitive deionization (CDI) cell;
(b) the said portions of the electrodes that lie in that relationship define a respective treatment-space between that pair of electrodes;
(c) the apparatus is so arranged as to deionize a liquid containing dissolved ionized materials, which is located in and passing through the treatment-space, by adsorption of ions into the electrodes;
the apparatus includes an inlet-port, through which liquid to be deionized is received into the apparatus;
the apparatus includes an outlet-port, through which deionized liquid is conveyed from the apparatus;
the apparatus includes a positive bus-rod and a negative bus-rod;
the bus-rods comprise respective rods of electrically conductive material;
the anodes include respective current-conducting tabs, which engage the positive bus-rod;
the cathodes include respective current-conducting tabs, which engage the negative bus-rod;
with respect to each tab:
(a) the tab is connected to the appropriate one of the bus-rods via a current-connector;
(b) the current-connector includes a tab-clamp, which is effective to exert a clamping force, termed the tab-clamping-force, upon the tab, of sufficient magnitude to ensure electrical contact with the tab;
(c) the current-connector also includes a rod-clamp, which is effective to exert a clamping force, termed the rod-clamping-force, upon the bus-rod, of sufficient magnitude to ensure electrical contact with the bus-rod;
(d) the current-connector exerts the tab-clamping-force on the tab, and the rod-clamping-force on the bus-rod, responsively to an axial-force applied to the tabs axially relative to the bus-rod.

2. As in claim 1, wherein:
the electrodes are formed with respective central through-holes;
in respect of each pair of electrodes, the treatment-space is defined as to its thickness by the face-to-face separation distance between the electrodes;
the treatment space is defined as to its outer and inner perimeters in that, outside the outer perimeter and inside the inner perimeter of the treatment-space, the electrodes are either curtailed, or are at such distance apart that capacitive deionization substantially cannot take place;
the apparatus includes an inlet-plenum, which receives liquid to be treated from the inlet-port;
the inlet-plenum is of such size and form that substantially no gradients or differences of pressure, except as induced by gravity, can exist throughout the inlet plenum;
the inlet-plenum surrounds the stack of electrodes, to the extent that the outer perimeters of the treatment-spaces of the pairs of electrodes are all open to the inlet-plenum, whereby liquid in the plenum can enter freely and evenly into all the treatment-spaces, thereby crossing the outer perimeters of the treatment-spaces;

the apparatus includes an outlet-plenum, which connects with the outlet-port;

the outlet-plenum lies inside the inner perimeters of the treatment spaces of the pairs of electrodes in the stack;

the outlet-plenum extends over the whole axial length of the stack of electrodes, and extends through the central through-holes of all the electrodes;

the outlet-plenum is of such size and form that substantially no gradients or differences of pressure, except as induced by gravity, can exist throughout the outlet-plenum;

the arrangement of the apparatus is such that deionized liquid, upon crossing the inner perimeters of the treatment-spaces of the pairs of electrodes, can enter freely and evenly and without inhibition into the outlet-plenum.

3. As in claim 1, wherein:

the current-connectors include respective blocks of electrically-conductive material;

the blocks are assembled on the bus-rods between adjacent tabs, and the tabs are assembled on the bus-rods between adjacent blocks;

whereby respective stacks are formed on the bus-rods, of blocks and tabs in an alternating-block-tab-block-tab-configuration;

the tab-clamps of the current-connectors are formed by clamping the stacks in a direction parallel to the lengths of the bus-rods; and the rod-clamps of the current-connectors are formed by clamping the blocks laterally onto the bus-rods.

4. As in claim 3, wherein:

the electrically conductive material of the blocks is graphite;

the blocks are provided with through-holes;

the blocks of the respective stacks of blocks are claimed clamped laterally to the bus-rods in that the holes in the blocks are a tight fit over the bus-rods.

5. As in claim 3, wherein:

the apparatus includes a one-way lock-washer, which is applied to one of the bus-rods, and is so structured as to be slidable along the bus-rod when urged therealong in one direction, but to lock to the bus-rod when urged in the other direction;

the stack of blocks on that bus-rod has been compressed, and the compression has been locked into the stack of blocks by means of the lock-washer acting upon the bus-rod;

whereby compression of the stack of blocks is reacted by tension of the bus-rod.

6. As in claim 5, wherein:

the apparatus includes a further one-way lock washer;

the stack of electrodes has been compressed, and the compression has been locked into the stack of electrodes by means of the further lock-washer acting upon the bus-rod;

whereby compression of the stack of electrodes is reacted by tension of the bus-rod.

7. As in claim 1, wherein:

the electrode includes a current-carrier of conductive material;

the electrode includes upper and lower electrode elements, which are respective thin sheets of high-surface-area conductive material, and which are in contact respectively with upper and lower surfaces of the current carrier; and the current-carrying tab of the electrode is formed in the current-carrier of the electrode.

8. As in claim 7, wherein, included in the upper and lower electrode elements are respective charge-barriers.

9. As in claim 1, wherein the axis of the stack of electrodes is vertical, and the bus-rods are vertical.

10. As in claim 1, wherein:

the outer perimeter of the treatment-space is a circle; and the inner perimeter of the treatment-space is a concentric circle.

11. As in claim 1, wherein the stack of electrodes is so arranged in the apparatus as to eliminate all pathways for liquid to travel between the inlet-port and the outlet-port, other than through the treatment spaces.

12. As in claim 1, wherein:

the bus-rods are located outside the outer perimeter of the treatment spaces;

the bus-rods are located within the inlet-plenum;

each tab protrudes radially outwards from the respective outer-perimeter of the treatment-space.

13. As in claim 1, wherein:

the current-connector is:
  (a) of electrically-conductive material;
  (b) assembled onto the bus-rod;
  (c) in contact with the tab;
  (d) a tight fit, laterally, on the bus-rod; and the current-connector and the bus-rod are so structured and arranged that subjecting the current-connector to compression in the axial direction is effective to make the fit in the lateral direction even tighter.

* * * * *